United States Patent [19]

Minjolle

[11] 4,271,110

[45] Jun. 2, 1981

[54] METHOD OF MANUFACTURING A CERAMIC UNIT FOR INDIRECT HEAT EXCHANGE AND A HEAT EXCHANGER UNIT OBTAINED THEREBY

[75] Inventor: Louis Minjolle, Tarbes, France

[73] Assignee: Ceraver, Paris, France

[21] Appl. No.: 76,103

[22] Filed: Sep. 17, 1979

[30] Foreign Application Priority Data

Sep. 22, 1978 [FR] France ............................ 78 27187

[51] Int. Cl.³ ............................ B29D 23/04

[52] U.S. Cl. ............................ 264/67; 264/86; 264/209.1

[58] Field of Search ............................ 264/67, 209, 86

[56] References Cited

U.S. PATENT DOCUMENTS

| | | | |
|---|---|---|---|
| 3,790,654 | 2/1974 | Bagley | 264/209 |
| 3,825,641 | 7/1974 | Barnett | 264/209 |
| 3,899,326 | 8/1975 | Frost et al. | 264/209 |
| 3,983,283 | 9/1976 | Bagley | 264/209 |

FOREIGN PATENT DOCUMENTS

| | | |
|---|---|---|
| 2380524 | 8/1978 | France . |
| 2414988 | 8/1979 | France . |

*Primary Examiner*—John Parrish
*Attorney, Agent, or Firm*—Sughrue, Rothwell, Mion, Zinn and Macpeak

[57] ABSTRACT

A ceramic unit for indirect heat exchange, said unit being formed by extruding raw ceramic material in a parallel duct configuration, piercing a first series of inlet and outlet orifices for a fluid at the ends of a first series of ducts, the axes of said orifices being perpendicular to those of the ducts, and firing the unit. The inlet orifices (5) and/or the outlet orifices (9) are formed by making oblique cuts (7,10) on the ends of the rows of ducts to provide inlet or outlet openings perpendicular to the common direction of the ducts and then closing off the ends of the obliquely cut rows. Application to heat exchangers for turbine engines.

7 Claims, 5 Drawing Figures

METHOD OF MANUFACTURING A CERAMIC UNIT FOR INDIRECT HEAT EXCHANGE AND A HEAT EXCHANGER UNIT OBTAINED THEREBY

FIELD OF THE INVENTION

The present invention relates to a method of manufacturing a ceramic unit for indirect heat exchange, said method consisting of extruding a raw ceramic material in a parallel duct configuration.

BACKGROUND OF THE INVENTION

The Applicant's published French Patent application No. 2 414 988 described a method of manufacturing a ceramic unit for indirect heat exchange, the method comprising extruding a raw ceramic material in a parallel duct configuration, piercing the ends of at least a first series of the ducts corresponding to one of the indirect heat exchange fluids with inlet and outlet orifices for a fluid to pass through said series of ducts, the axes of the orifices being perpendicular to the common direction of said ducts, and firing the unit to give it the required mechanical strength.

In such a method, the inlet and outlet orifices for one of the fluids are formed by piercing the walls of the ducts at the end of one of the series of ducts. These orifices must be formed not only in the outer walls of the unit, but also in its inner walls which separate adjacent ducts. This gives rise to manufacturing difficulties, since the walls must not be deformed thereby and it is difficult and expensive to form the orifices in the unit after firing. The orifices also cause appreciable loss of head in the finished unit when in use.

SUMMARY OF THE INVENTION

Preferred embodiments of the invention provide a simple, rapid and inexpensive heat exchanger unit of this type and a method of manufacturing it, in which the heat inlet and outlet openings cause only slight loss of head.

The present invention provides a method of manufacturing a ceramic unit for indirect heat exchange. The method comprises an initial step of extruding a raw ceramic material in a parallel duct configuration, followed by two inlet/outlet forming steps of closing every other row of ducts in the plane of at least one of the ends of the extruded unit and of obliquely cutting said rows of ducts prior to the ends being closed to form inlet or outlet orifices which are perpendicular to the common direction of the ducts, and a firing step of firing the unit, the firing step taking place later than the said step of closing the ends of the rows of ducts.

Preferably, it also has at least one of the following characteristics.

The ends of the rows of ducts are closed by dipping them in slip.

The ceramic unit is cut obliquely before it is fired.

Both ends of the same rows of ducts are cut obliquely.

Oblique saw cuts are made symmetrically to a longitudinal plane of symmetry of the unit, these oblique saw cuts forming two bevel-shaped openings.

At one end of the unit, half the rows of ducts are obliquely cut and at the other end of the unit, the other half of the rows of ducts are obliquely cut.

The raw ceramic material is extruded in a parallel duct configuration with different cross-sections, the ducts through which hot fluid is to flow having larger cross-sections than those of the ducts through which cold fluid is to flow.

The invention also provides a heat exchanger unit manufactured by the above defined method.

Heat exchanger units manufactured by the method according to the invention are described by way of example and with reference to the accompanying drawings.

DESCRIPTION OF PREFERRED EMBODIMENTS

Figure 1:
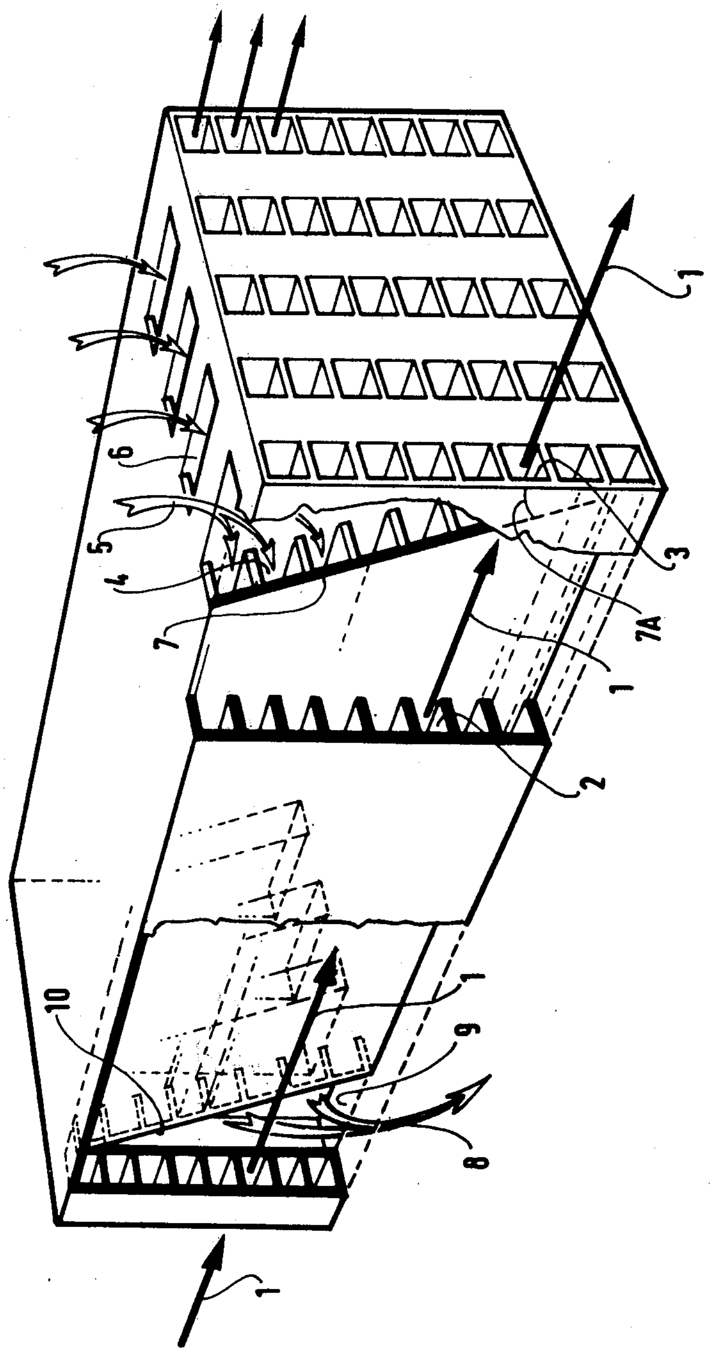
FIG. 1 illustrates a heat exchanger unit in which the inlet and outlet flows of one of the fluids are parallel to the general axis of the unit, while the inlet and outlet flows of the other fluid are perpendicular to said axis, via oblique saw cuts in the rows of ducts through which the said other fluid flows.

In the heat exchanger unit illustrated in FIG. 1, the flow direction of the first fluid which enters and leaves parallel to the axis of the unit is shown by arrows 1. The fluid flows in ducts such as 2 of square cross-section and leaves through end orifices such as 3. The second fluid enters every other row of heat exchanger ducts such as 4 perpendicularly to the duct axes (arrow 5), via orifices 6 which are formed by saw cuts 7, at an acute angle 7A to the plane of the end of the heat exchanger unit. These saw cuts are preferably made in the raw ceramic unit, but can also be made on the pre-fired (biscuit) or fired ceramic heat exchanger unit. After flowing in the heat exchanger unit against the flow of the first fluid, the second fluid leaves the heat exchanger unit perpendicularly to the axis (arrow 8) through side orifices 9 formed by saw cuts 10 at the other ends of the same rows of ducts.

Figure 2:
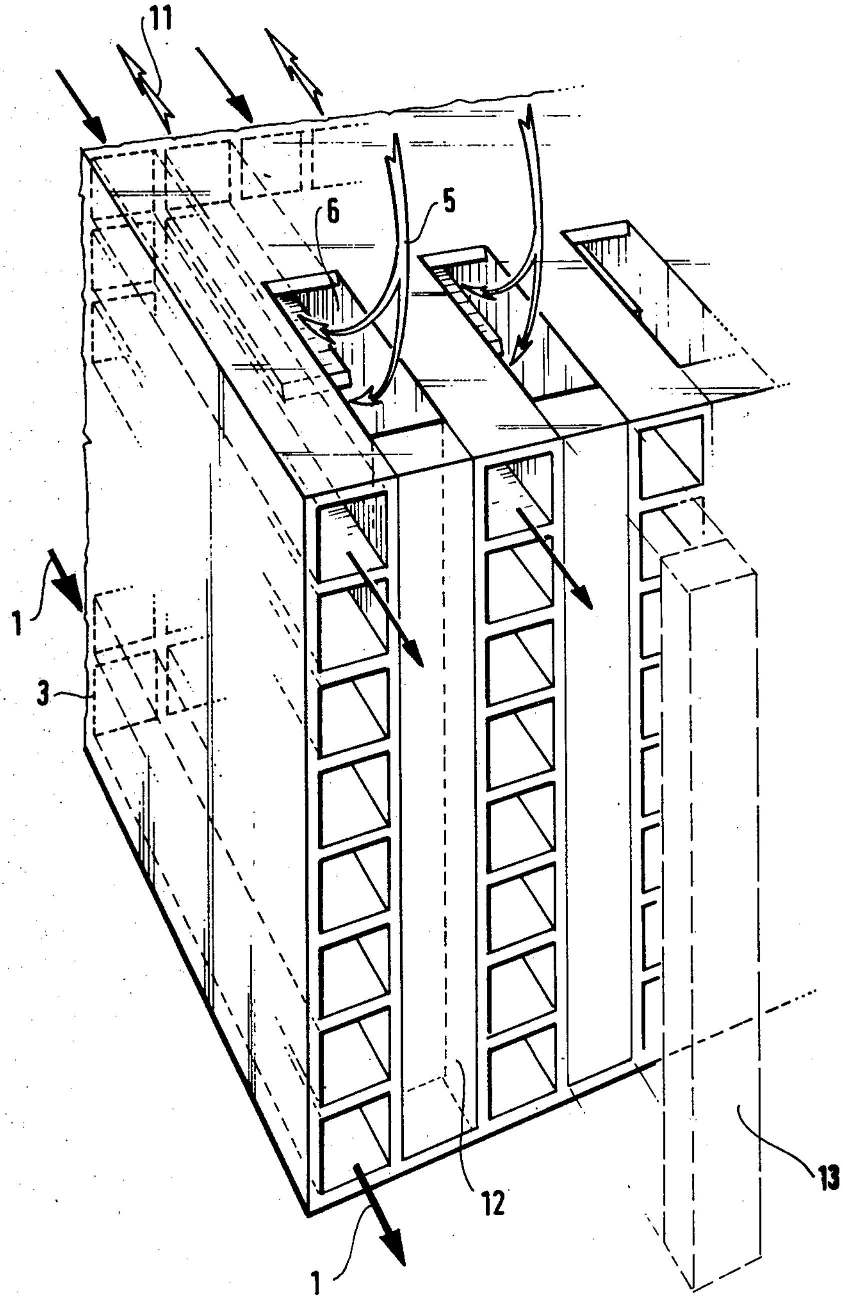
FIG. 2 illustrates on a larger scale the ends of a few of the flow ducts and shows how a row of flow ducts for one of the fluids is blocked before the outlet openings of said ducts are pierced.

In the detail of the end of the heat exchanger unit illustrated in FIG. 2, the flow direction of the first fluid, which enters the heat exchanger unit parallel to its axis through the orifices 3 and which flows towards the front of the figure in a first series of rows of ducts, is indicated by the arrows 1. The second fluid enters the heat exchange unit perpendicularly to its axis in the direction of the arrows 5 via the orifices 6 and then flows along the intermediate rows of ducts towards the back of the Figure, in the direction of arrows 11.

After the inlet openings have been formed by saw cuts, the rows of ducts in which the second fluid flows are closed by bars such as 12 and 13 (the bar 13 being also shown removed from the heat exchanger unit). These bars are made either by separate manufacture followed by bonding with an enamel or a cement, or, preferably, by dipping the end of the heat exchanger unit in slip, the openings 3 of the other rows of ducts being masked by detachable screens of flexible material, e.g. flexible plastics material. If slip based on the same material as the heat exchanger unit or based on refractory cement is sufficiently viscous, the rows of ducts will be closed effectively and it will only be necessary to fire the slip at a temperature at least equal to the operation temperature.

Figure 3:
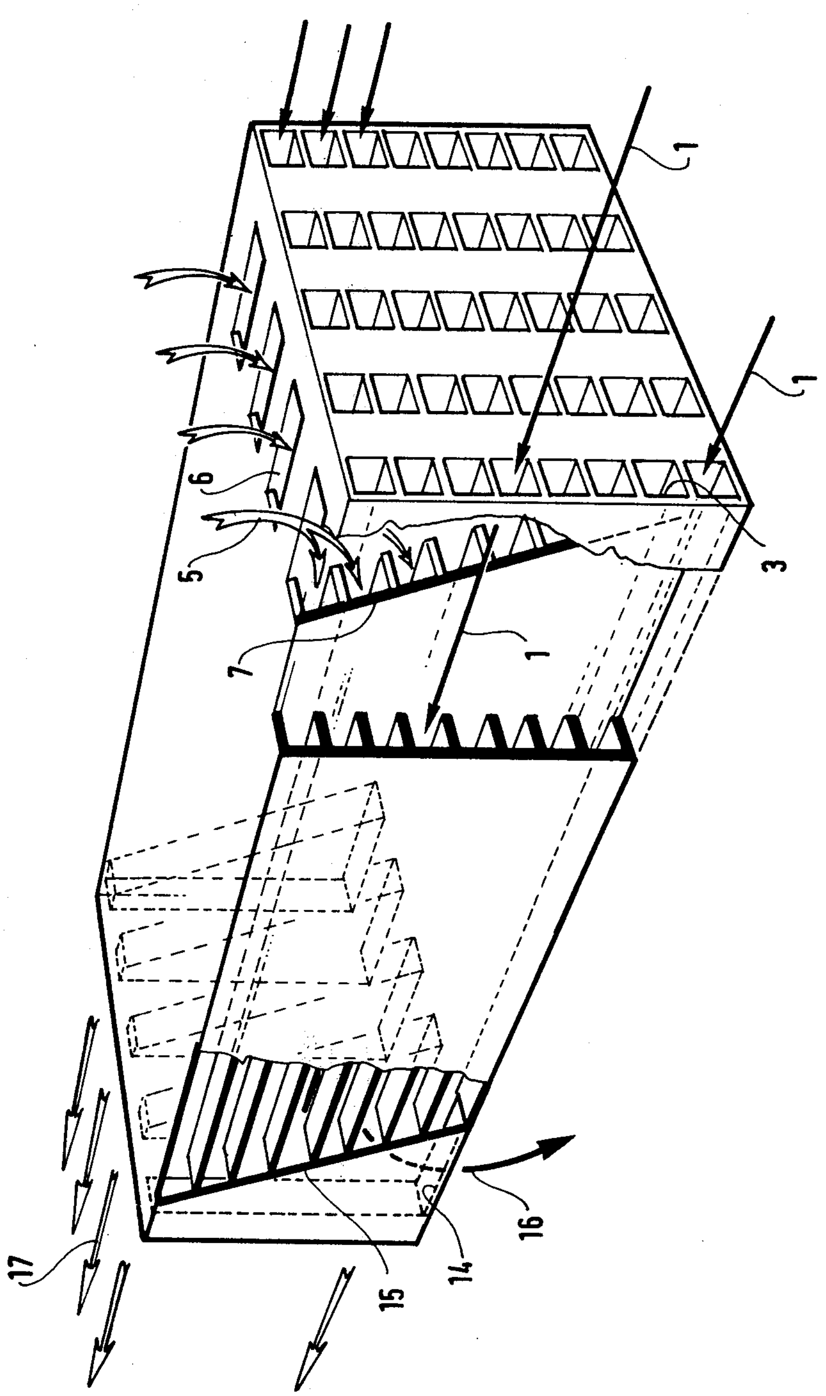
FIG. 3 illustrates a heat exchanger unit in which one of the fluids is brought in parallel to the axis and removed perpendicularly thereto, while the other fluid is brought in perpendicularly to the axis and removed parallel thereto, the side openings being likewise formed by saw cuts at the ends of the rows of ducts for removal perpendicular to the axis.

FIG. 3 illustrates a heat exchanger unit in which one of the fluids enters perpendicularly to the axis and leaves parallel thereto, while the second fluid enters parallel to the axis and leaves perpendicularly thereto. The first fluid, which flows in the direction of the arrows 1, enters the heat exchanger unit through the front orifices 3 and leaves the heat exchanger unit in the direction of arrow 16 via orifices 14 formed by saw cuts such as 15. The second fluid enters perpendicularly to the axis as shown by the arrows 5, via the side orifices 6 formed by saw cuts such as 7, and then flows in a direction parallel to that of the first fluid and is removed parallel to the axis, in the direction of arrows 17.

Figure 4:
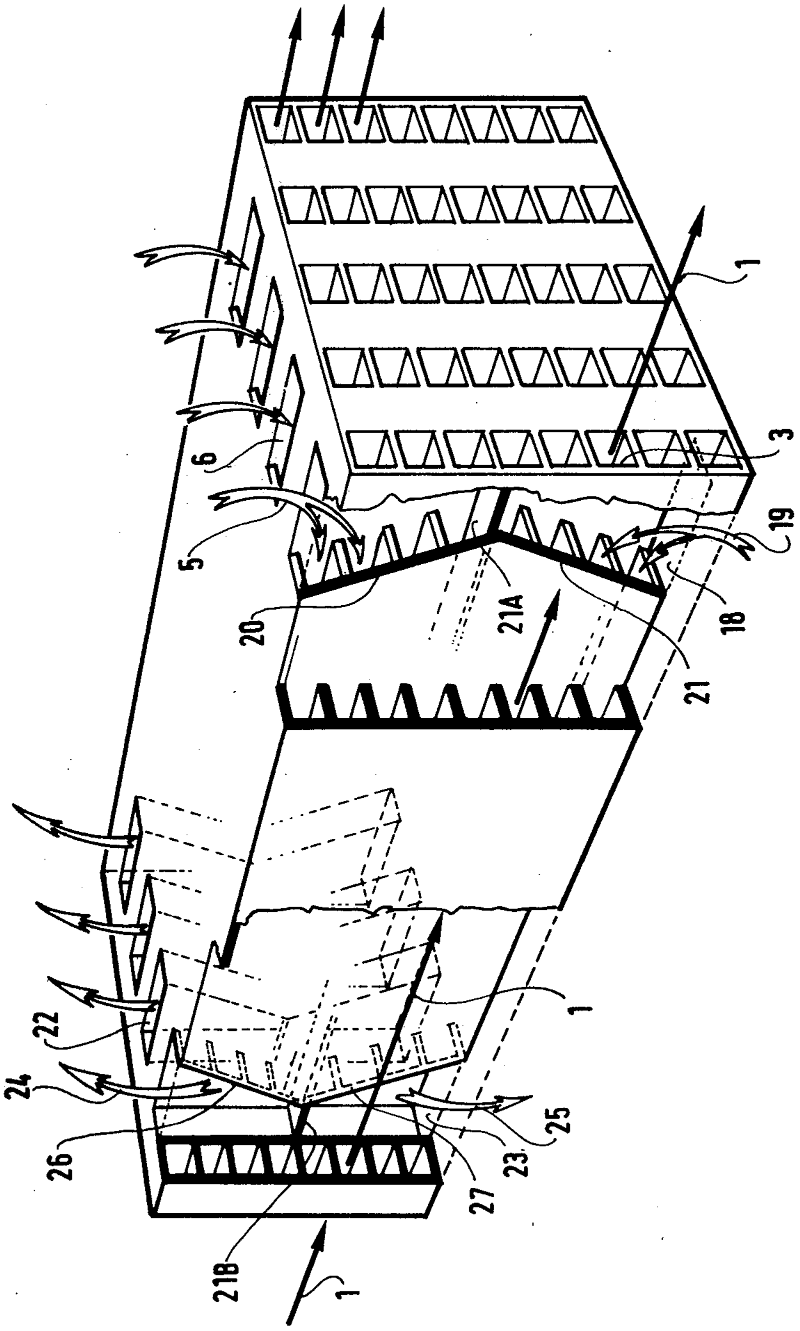
FIG. 4 illustrates a heat exchanger unit in which one of the fluids is brought in and removed parallel to the axis, while the other fluid is brought in and removed perpendicularly to the axis, on either side of a plane of symmetry, by means of bevel-shaped cuts at the ends of the ducts which correspond to the said fluid.

FIG. 4 illustrates a heat exchanger unit in which one of the fluids enters and leaves the unit parallel to its axis, while the second fluid enters and leaves the unit perpendicular to its axis, on either side ot the horizontal plane of symmetry of the unit. The first fluid flows longitudinally in the direction of the arrows 1 and leaves through the end openings such as 3. The second fluid enters perpendicularly to the axis of symmetry of the heat exchanger unit, firstly in the direction of the arrows 5 through the openings 6, and secondly in the direction of arrows 19 through openings 18. These openings are formed by two symmetrical saw cuts 20 and 21 which form a bevel whose edges are symmetrical with respect to the horizontal plane of symmetry of the heat exchanger unit corresponding to partitions such as 21A between ducts. After flowing along the ducts of the corresponding rows, the second fluid leaves in the same way, perpendicularly to the plane of symmetry of the heat exchanger unit, in the direction of arrows 24,25, through openings 22,23 formed by saw cuts which are symmetrical with respect to the horizontal plane of symmetry embodied by the ends 21B of the middle partitions.

Figure 5:
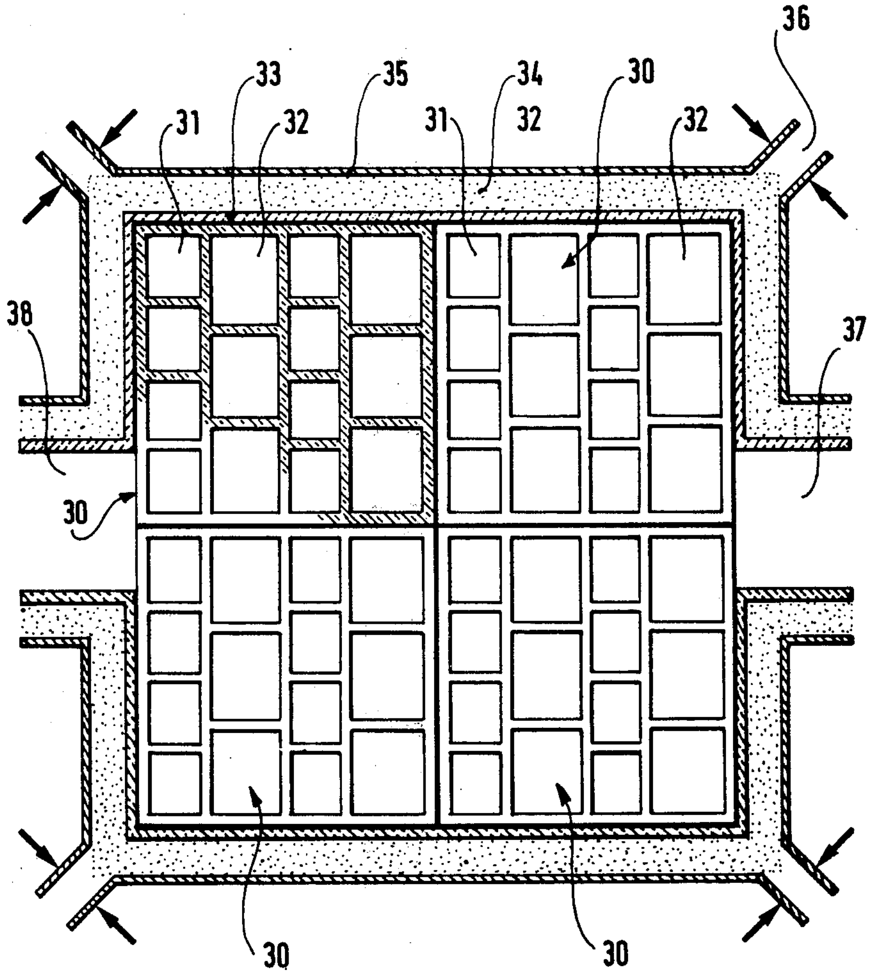
FIG. 5 illustrates a cross-section of a heat exchanger formed by side-by-side nesting of four units similar to that of FIG. 1, but in which the cross-sections of the ducts through which hot fluid flows are greater than those of the ducts through which cold fluid flows.

The heat exchanger with four juxtaposed units illustrated in a cross-section in FIG. 5 is made of four units such as 30 grouped together in a square configuration and including cold fluid flow ducts 31 and hot fluid flow ducts 32, the overall cross-section of the ducts 32 being greater than that of the ducts 31. The four units are surrounded by a ceramic casing 33 made of the same material as the units 30, embedded in thermal insulation material 34 which is itself surrounded by a metal casing 35. The metal casing is clamped on the insulation material at angles 36 by means of nuts and bolts and clamping is limited by springs (the nuts, bolts and springs not being shown). Side orifices, e.g. 37 and 38, of the ceramic casing, disposed respectively above and below the casing, allow the heat exchange fluids to enter and to leave the right-hand and left-hand units of the heat exchanger. Of course, the heat exchanger itself can include several units such as 30, superposed perpendicularly to the plane of FIG. 5 and assembled by means of intermediate sealing parts.

Due to their modular structure which makes it possible to assemble them as a function of available space, heat exchangers made of a ceramic material and manufactured by the method of the invention are particularly suitable as heat exchangers for turbine engines, in which the material of the heat exchanger must withstand high temperatures of about 1200° C. to 1400° C. They can then be made e.g. of silicon nitride, and also of mullite, cordierite or silicon nitride modified by aluminium and oxygen, of the type called SiAlON. However, they apply also to other industrial operations, e.g. to recovering heat from furnace gases.

I claim:

1. A method of manufacturing a ceramic unit for indirect heat exchange, said method comprising an initial step of extruding a raw ceramic material in a parallel duct configuration, the improvement comprising two inlet/outlet forming steps of:

obliquely cutting every other row of ducts whose ends are to be closed to form inlet or outlet orifices which are perpendicular to the common direction of the ducts, and closing said rows of ducts whose ends are cut in the plane of at least one of the ends of the extruded unit, and firing the unit, the firing step taking place later than said step of closing the ends of said rows of ducts.

2. A method of claim 1, wherein the ends of the rows of ducts are closed by dipping them in slip.

3. A method according to claim 1, wherein the rows of ducts whose ends are closed, are cut obliquely before the unit is fired.

4. A method according to claim 1, wherein both ends of the same rows of ducts are cut obliquely.

5. A method according to claim 4, wherein the oblique cuts are made symmetrically to a longitudinal plane of symmetry of the unit, the oblique saw cuts forming two bevel-shaped openings.

6. A method according to claim 1, wherein one half of the rows of ducts are obliquely cut at one end of the unit and the other half of the rows of ducts are obliquely cut at the other end of the unit.

7. A method according to claim 1, wherein the raw ceramic material is extruded in a parallel duct configuration with different duct cross-sections, the ducts through which hot fluid is to flow having larger cross-sections than those of the ducts through which cold fluid is to flow.

* * * * *